United States Patent [19]

Euler

[11] 4,364,615

[45] Dec. 21, 1982

[54] RETAINING RING

[75] Inventor: Richard W. Euler, LaPorte, Ind.

[73] Assignee: The Bendix Corporation, Southfield, Mich.

[21] Appl. No.: 185,079

[22] Filed: Sep. 8, 1980

[51] Int. Cl.$^3$ ........................ F16C 33/30; F16C 33/00; F16C 13/00; F16C 35/00

[52] U.S. Cl. ................................ 308/236; 308/189 A; 308/189 R; 267/159; 267/161; 267/163

[58] Field of Search ............... 308/236, 189 A, 189 R; 267/159, 161, 163

[56] References Cited

U.S. PATENT DOCUMENTS 1,923,399 8/1933 Sharp ............................ 308/189 A
2,630,897 3/1953 Porter ................................ 267/161
3,107,766 10/1963 Pritchard ........................ 267/161 X
3,259,383 7/1966 Johnson et al. ..................... 267/161
3,483,888 12/1969 Wurzel ............................ 267/161 X

FOREIGN PATENT DOCUMENTS 463551 7/1928 Fed. Rep. of Germany ...... 267/161
1054789 4/1959 Fed. Rep. of Germany ...... 308/236

*Primary Examiner*—Henry K. Artis
*Attorney, Agent, or Firm*—Paul D. Schoenle; Ken C. Decker

[57] ABSTRACT

A retaining ring (30) includes a cone-shaped, resilient rim (32) which defines a Belleville-type spring. A plurality of resilient teeth (36) extend radially inwardly or radially outwardly from one of the inner or outer edges of the rim, respectively. The retaining ring is receivable onto a shaft or into a housing bore where the resilient teeth (36) engage an annular groove (28) to retain the ring. The Belleville-type spring portion of the retaining ring provides a continuous axial force and allows for the resilient take-up of manufacturing tolerances in assemblies employing the retaining ring.

3 Claims, 9 Drawing Figures

120 122 112 114 116 134 136 146 152 154 118 130 128 144 150 148 124 126

A B 34 44 E 38 C D 36 32

A B 138 134 E C D 136 144 132

RETAINING RING

The invention relates to retaining rings. Retaining rings are commonly used to secure a bearing, or other member having a bore therein, to a shaft. Retaining rings are also used to retain a bearing or other member within a housing bore. When a bearing is fitted on a shaft or in a housing bore, it is usually desirable to have the bearing resiliently retained in place by a resilient device providing a controlled axial load to the bearing. Because of its resiliency, the retaining device is able to take-up some manufacturing tolerances and to eliminate undesirable axial play from the bearing.

Retaining rings are known which have the form of a split ring. These split rings are resilient. They are commonly referred to as "snap rings." The configurations of these split rings varies. They are available for either internal or external application. The confronting ends of the snap ring are usually provided with grooves or apertures by which the ring may be grasped for installation. In order to provide an axial loading, bowed snap rings are available.

Bowed snap rings are curved and define radii with respect to an axis which is parallel to and spaced from the plane defined by the ring. Bowed snap rings may be employed to provide an axial preload for a bearing and to take-up manufacturing tolerances in ways which are well known in the art. Snap rings are available under a variety of tradenames. For example, snap rings of this type are sold under the tradename, Truarc.

With a bowed retaining ring of the type described above, the retaining ring provides a limited area of contact with the shaft and with the bearing. As a result, the axial load provided by the retaining ring is limited.

The invention as claimed is intended to avoid the shortcomings of prior retaining rings by providing a retaining ring having a cone-shaped resilient rim. A plurality of resilient teeth extend radially from the rim. The teeth are engageable with an annular groove in a shaft or in a housing bore to retain the ring. The resilient rim of the ring defines a Belleville-type spring which provides continuous circumferential contact with the retained member. Additionally, the Belleville-type spring provides an inherently high spring rate in comparison to the amount of material needed to make the retaining ring. As a result, the invention provides a desired preload with a lesser expenditure of material resources than is required by prior retaining rings.

The advantages offered by the invention are mainly that the retaining ring provides a substantially continuous circumferential contact with the shaft or housing and with the bearing; the Belleville-type spring defined by the resilient rim of the retaining ring provides an inherently high spring rate; and the retaining ring is able to take-up manufacturing tolerances from assemblies and to eliminate axial play from bearings. Additionally, the invention provides an inherently strong retaining ring. Because of its high strength, a retaining ring according to the invention may be made smaller than prior retaining rings of equal strength. Therefore, the invention may allow a reduction in the size of many assemblies which use retaining rings.

Two ways of carrying out the invention are described below with reference to drawings which illustrate only these two specific embodiments, in which.

Figure 1:
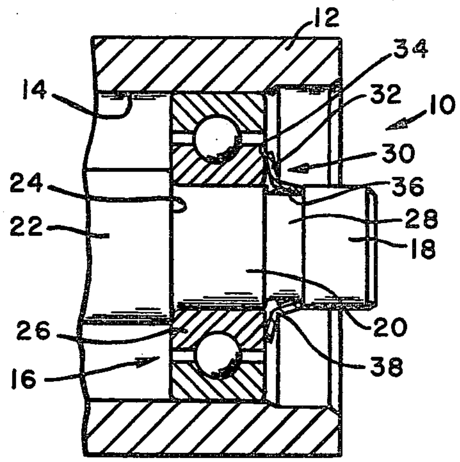
FIG. 1 is a fragmentary view, partly in cross-section, of a retaining ring according to the invention holding a bearing on a shaft.

With reference to FIG. 1, an assembly 10 includes a housing 12 having a bore 14 therein. A ball bearing 16 is slidably received in bore 14 in order to journal a shaft 18 therein. The shaft 18 includes a small diameter portion 20 and a large diameter portion 22. The portions 20 and 22 cooperate to define a shoulder 24 therebetween. The left side of the inner race 26 of bearing 16 engages the shoulder 24. The small diameter diameter portion 20 of shaft 18 defines an annular groove 28 which circumscribes the small diameter portion 20. A retaining ring 30 is received in the groove 28.

Retaining ring 30 includes a resilient, cone-shaped rim 32 which defines a Belleville-type spring. The radially outer edge 34 of rim 32 engages the inner race 26 of the bearing 16. In order to engage the shaft 18, the ring 30 includes a plurality of resilient teeth 36 which extend axially and radially inwardly from the radially inner edge 38 of the rim 32. The teeth 36 are received in the groove 28. The retaining ring 30 is distorted between the inner race 26 and the groove 28. As a result, the retaining ring 30 provides a continuous leftward force biasing the bearing 16 against the shoulder 24.

Figure 2:
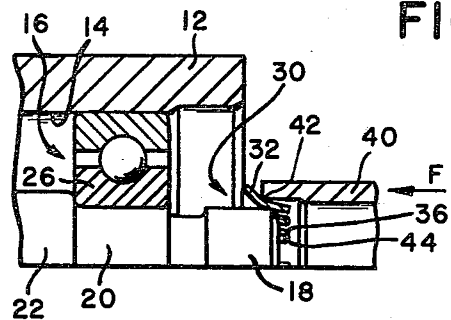
FIG. 2 is a fragmentary view similar to FIG. 1 and partly in cross-section, of a retaining ring preparatory to its assembly on a shaft.

Viewing FIG. 2, the retaining ring 30 is illustrated in its undistorted condition preparatory to assembly of the ring onto the shaft 18 via a tool 40. The tool 40 is a tubular member having a circumferential end edge 42 which engages the rim 32 of retaining ring 30 adjacent to the inner edge 38. It will be noted that the inner edge 38 defines a diameter which is greater than the diameter of shaft portion 20. Additionally, the teeth 36 terminate in end edges 44. The end edges 44 of teeth 36 cooperate to define a diameter which is less than the diameter of shaft portion 20.

Figure 3:
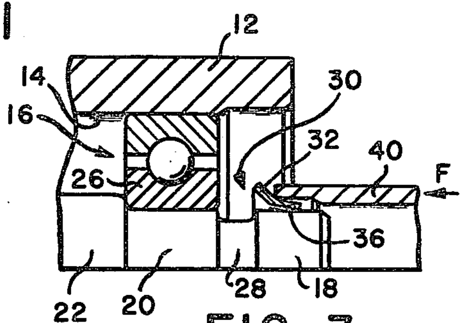
FIG. 3 is a fragmentary view similar to FIG. 2 of a retaining ring at an intermediate stage of assembly with a shaft.

In order to assemble retaining ring 30 onto shaft 18, an axial force F is applied to ring 30 via the tool 40. As a result, the resilient teeth 36 yield to allow the ring 30 to slide over the small diameter portion 20 of shaft 18, viewing FIG. 3. It will be noted upon examination of FIG. 3 that the rim portion 32 of ring 30 remains substantially in its undistorted condition.

Figure 4:
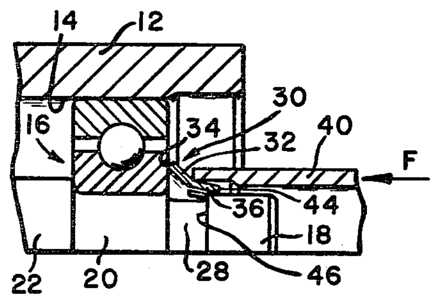
FIG. 4 is a fragmentary view similar to FIG. 3 of a retaining ring at a later intermediate stage of assembly with a shaft.

FIG. 4 illustrates the engagement of the radically outer edge 34 of rim 32 of retaining ring 30 with the inner race 26 of bearing 16. It will be noted that the axial dimension of retaining ring 30 from the outer edge 34 of rim 32 to the end edges 44 of teeth 36 exceeds the axial spacing of the inner race 26 of bearing 16 from the right wall 46 of groove 28. In order to engage the resilient teeth 36 of the retaining ring 30 with the groove 28, a leftward force F is applied to the ring 30 via the tool 40. The leftward force F distorts the resilient rim 32 and flattens the rim 32 axially.

Figure 5:
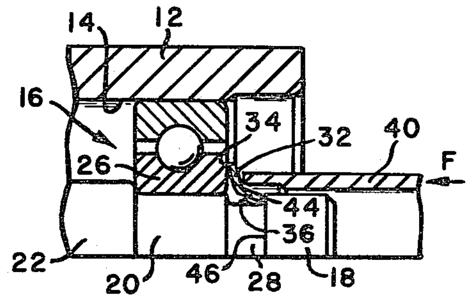
FIG. 5 is a fragmentary view similar to FIG. 4 of a retaining ring at the final stage of assembly with a shaft.
Figure 6:
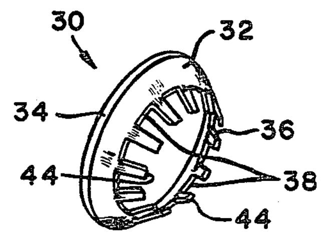
FIG. 6 is a perspective view of the retaining ring illustrated in FIGS. 1-5.

Viewing FIG. 5, it will be seen that the flattening of the rim 32 of retaining ring 30 because of the leftward force F allows the end edges 44 of teeth 36 to move to the left of the right-hand wall 46 of groove 28. As a result, the resilient teeth 36 spring radially inwardly into the groove 28. When the axial force F is relieved and the tool 40 is removed, the rim 32 of the retaining ring 30 partially recovers its cone shape. As a result, the end edges 44 of teeth 36 engage the right-hand wall 46 of groove 28. The outer edge 34 of rim 32 engages the inner race 26 of bearing 16, as illustrated in FIG. 1. Because the rim 32 of retaining ring 30 defines a Belleville-type spring, the retaining ring 30 provides a continuous leftward axial force on bearing 16.

Figure 7:
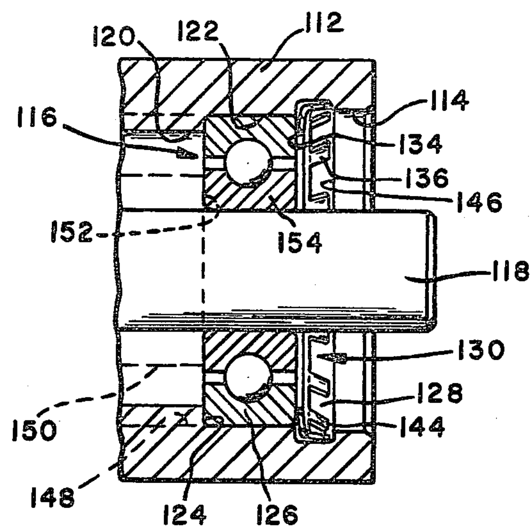
FIG. 7 is a fragmentary view, partly in cross-section, of an alternative embodiment of the invention.
Figure 8:
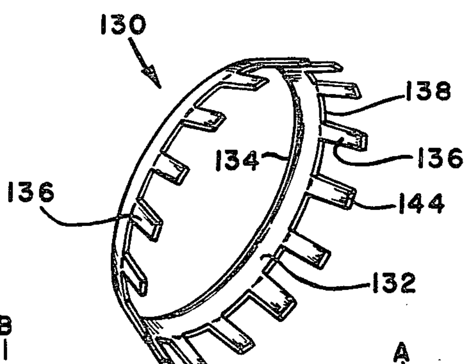
FIG. 8 is a perspective view of the retaining ring illustrated in FIG. 7.

FIGS. 7 and 8 illustrate an alternative embodiment of the invention. Features of the invention which are analogous in function to those illustrated in FIGS. 1–6 are referenced in FIGS. 7 and 8 with the same numeral which was previously used and increased by 100.

Viewing FIG. 7, it will be noted that a housing 112 defines a stepped bore 114 having a small diameter portion 120 and a large diameter portion 122. The portions 120 and 122 cooperate to define a shoulder 124. In order to journal a shaft 118 in the bore 114, a bearing 116 is slidably received in the bore portion 122. The outer race 126 of bearing 116 engages the shoulder 124. The housing 112 defines an annular groove 128 adjacent the right side of the bearing 116. A retaining ring 130 is received in the groove 128.

Viewing FIG. 8, it will be noted that the retaining ring 130 includes a cone-shaped, resilient inner rim 132 and a plurality of resilient teeth 136 which extend radially outwardly from the inner rim 132. The teeth 136 engage the right-hand wall 146 of the groove 128, viewing FIG. 7. The cone-shaped, resilient inner rim 132 of retaining ring 130 defines a Belleville-type spring which provides a continuous leftward force to the outer race 126 of the bearing 116. Consequently, the bearing 116 is biased against the shoulder 124.

Those skilled in the art will recognize that the bore 114 in housing 112 may be made of a uniform diameter, viewing FIG. 7, as is illustrated at 148. Further, the shaft 118 may be stepped to an increased diameter 150 in order to provide a shoulder 152 on the shaft 118. Consequently, the inner race 154 of bearing 116 engages the shoulder 152 to axially locate the bearing. Retaining ring 130 provides a continuous leftward force to the outer race 126 of the bearing 116. Consequently, the outer race 126 of bearing 116 is resiliently preloaded leftwardly with respect to the inner race 154 so that axial play is eliminated from the bearing 116.

The retaining ring 130 is installed into the groove 128 by the use of a tool which engages the retaining ring 130 adjacent the radially outer edge 138 of the inner rim 132. By the use of such a tool, the retaining ring 130 is forced into the bore 114 and groove 128 in much the same way as the retaining ring 30 illustrated in FIGS. 1–6 is forced onto the shaft 18 and into the groove 28.

Figure 9:
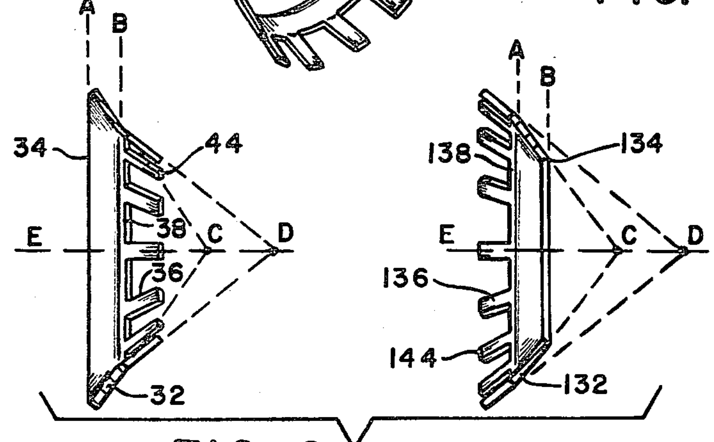
FIG. 9 is a fragmentary cross-sectional view of the retaining rings illustrated by FIGS. 1-6, 7 and 8, illustrating the planes, principle axes and vertices defined by the retaining rings.

FIG. 9 illustrates the geometries of both embodiments of the retaining ring. With reference to FIG. 9, the embodiments illustrated by FIGS. 1–6 and 7, 8, are illustrated in cross section. Upon inspection of FIG. 9, it will be seen that the radially outer and inner edges, 34 (138) and 38, (134) respectively, of the cone-shaped resilient rim 32 (132) define a conical surface converging toward a vertex C. The plurality of resilient teeth 36 (136) cooperate to define a second conical surface converging toward a second vertex D which is spaced from the vertex C. The edges 34 (138) and 38 (134) also define a pair of spaced apart planes A and B, respectively. The conical surfaces defined by the rim 32 (132) and teeth 36 (136) share the same principle axis E so that the vertices C and D both lie on the axis E.

I claim:

1. Apparatus comprising in combination:

a shaft defining an annular groove therein, a bearing member having an aperture therein and received on said shaft, said bearing member defining a radial surface adjacent said groove, abutment means on said shaft for preventing said bearing member from moving in one axial direction relative to said shaft, a retaining ring received in said groove and engaging said bearing member, said retaining ring including a cone-shaped resilient rim having a radially outer edge engaging said radial surface and a plurality of resilient teeth engaging said groove, said rim defining a Belleville spring providing a continuous axial load biasing said bearing member in said one axial direction toward said abutment means, said plurality of resilient teeth extending axially in an opposite direction to said one axial direction, and said plurality of resilient teeth expanding radially outwardly when said retaining ring is disposed on said shaft whereby said plurality of resilient teeth will expand radially Inwardly into said groove when in alignment therewith in order to substantially prevent separation of said retaining ring from said shaft.

2. Apparatus comprising in combination:

a housing defining a bore therein and an annular groove circumscribing said bore, a bearing member received in said bore, said bearing member defining a radial surface adjacent said groove, abutment means for preventing said bearing member from moving in one axial direction relative to said housing, a retaining ring received in said groove and engaging said bearing member, said retaining ring including a cone-shaped resilient rim having a radially inner edge engaging said radial surface and a plurality of resilient teeth engaging said groove, said rim defining a Belleville spring providing a continuous axial load biasing said bearing member in said one axial direction toward said abutment means, said plurality of resilient teeth extending axially in an opposite direction to said one direction, and said plurality of resilient teeth expanding radially inwardly when said retaining ring is in engagement with said housing remote from said groove whereby said plurality of resilient teeth will expand radially outwardly into said groove when in alignment therewith in order to substantially prevent separation of said retaining ring from said housing.

3. Apparatus according to claim 1 or 2 in which said cone-shaped resilient rim cooperates with said plurality of resilient teeth to define an angle opening substantially opposite said one axial direction and said angle is decreased in response to movement of said bearing member away from said one axial direction.

* * * * *